(12) United States Patent
Joye et al.

(10) Patent No.: US 7,742,595 B2
(45) Date of Patent: Jun. 22, 2010

(54) CRYPTOGRAPHIC METHOD PROTECTED AGAINST COVERT CHANNEL TYPE ATTACKS

(75) Inventors: Marc Joye, Saint Zacharie (FR); Benoit Chevallier-Mames, Aubagne (FR)

(73) Assignee: Gemalto SA, Meudon (FR)

( * ) Notice: Subject to any disclaimer, the term of this patent is extended or adjusted under 35 U.S.C. 154(b) by 1447 days.

(21) Appl. No.: 10/509,876

(22) PCT Filed: Apr. 3, 2003

(86) PCT No.: PCT/FR03/01058

§ 371 (c)(1),
(2), (4) Date: Apr. 4, 2005

(87) PCT Pub. No.: WO03/083645

PCT Pub. Date: Oct. 9, 2003

(65) Prior Publication Data

US 2005/0163312 A1    Jul. 28, 2005

(30) Foreign Application Priority Data

Apr. 3, 2002   (FR) .................................. 02 04117

(51) Int. Cl.
*H04L 9/28* (2006.01)
*H04K 1/00* (2006.01)
(52) U.S. Cl. ..................................................... 380/28
(58) Field of Classification Search ........................ None
See application file for complete search history.

(56) References Cited

U.S. PATENT DOCUMENTS

| | | | | |
|---|---|---|---|---|
| 6,278,783 | B1 * | 8/2001 | Kocher et al. | 380/277 |
| 6,724,894 | B1 * | 4/2004 | Singer | 380/28 |
| 6,907,526 | B2 * | 6/2005 | Tanimoto et al. | 713/174 |
| 6,940,975 | B1 * | 9/2005 | Kawamura et al. | 380/37 |
| 6,965,673 | B1 * | 11/2005 | Boneh et al. | 380/28 |
| 7,020,281 | B2 * | 3/2006 | Vadekar et al. | 380/28 |
| 7,142,670 | B2 * | 11/2006 | Chari et al. | 380/28 |
| 7,188,282 | B2 * | 3/2007 | Walmsley | 714/718 |
| 7,254,718 | B2 * | 8/2007 | Kaminaga et al. | 713/194 |
| 7,278,034 | B2 * | 10/2007 | Shipton | 713/300 |
| 7,302,592 | B2 * | 11/2007 | Shipton et al. | 713/300 |
| 7,404,089 | B1 * | 7/2008 | Campagna et al. | 713/194 |

(Continued)

OTHER PUBLICATIONS

Karri et al, "Concurrent Error Detection of Fault-Based Side-Channel Cryptanalysis of 128-Bit Symmetric Block Ciphers", Jun. 2001, DAC 2001, p. 579-584.*

(Continued)

*Primary Examiner*—Christopher A Revak
(74) *Attorney, Agent, or Firm*—Buchanan, Ingersoll & Rooney, PC

(57) ABSTRACT

The invention relates to a cryptographic method secured against a covert channel attack. According to the invention, in order to carry out a selected block of instructions as a function of an input variable amongst N predefined instruction blocks, a common block is carried out on the predefined N instruction blocks, a predefined number of times, the predefined number being associated with the selected instruction block.

23 Claims, 1 Drawing Sheet

U.S. PATENT DOCUMENTS

| | | | |
|---|---|---|---|
| 2001/0053220 A1* | 12/2001 | Kocher et al. | 380/29 |
| 2003/0133567 A1* | 7/2003 | Yajima et al. | 380/30 |
| 2005/0152539 A1* | 7/2005 | Brickell | 380/28 |
| 2006/0023873 A1* | 2/2006 | Joye | 380/28 |
| 2006/0045264 A1* | 3/2006 | Kocher et al. | 380/37 |
| 2006/0133603 A1* | 6/2006 | Joye et al. | 380/28 |
| 2007/0237326 A1* | 10/2007 | Nonaka et al. | 380/37 |

OTHER PUBLICATIONS

Biryukov et al, "Side Attacks", 1999, FSE '99, p. 1-5.*
Novak, "Side-Channel Attack on Substitution Blocks", 2003, ACNS 2003, p. 1-12.*

* cited by examiner

CRYPTOGRAPHIC METHOD PROTECTED AGAINST COVERT CHANNEL TYPE ATTACKS

This disclosure is based upon French Application No. 02/04117, filed Apr. 3, 2002, and International Appln. No. PCT/FR03/01058, filed Apr. 3, 2003, the contents of which are incorporated herein.

BACKGROUND OF THE INVENTION

The invention relates to a cryptographic method protected against attacks of the covert channel type. The invention is in particular advantageous for protecting algorithms during which a block of instructions from amongst several different blocks of instructions is executed as a function of an input variable. Such an algorithm is for example, but not limitingly, a binary exponentiation algorithm performing a calculation of the type $B=A^D$, with A, B and D being integer numbers. Such an algorithm is for example implemented in electronic devices such as chip cards.

The outline diagram of such an algorithm is depicted in FIG. 1. It comprises a first step of testing the value of an input data item. According to the result of the test, a block of instructions $\Pi_0$ or a block of instructions $\Pi_1$ is carried out. The algorithm can then terminate, or a new test step is performed on another input variable. In the example of an operation of the type $B=A^D$, the input variable is a bit $D_i$ of D and the diagram in FIG. 1 is repeated successively for each bit of D.

The blocks of instructions $\Pi_0$, $\Pi_1$ each comprise a set of instructions to be executed, for example operations of addition, multiplication, variable updating, etc. The number and/or the type of instruction may be different from one block of instructions $\Pi_0$, $\Pi_1$ to the other.

Many cryptographic algorithms are based on the outline diagram in FIG. 1. This is in particular the case with cryptographic algorithms based on exponentiation calculations of the type $B=A^D$, where A, B are integer numbers usually of large size, and D a predetermined number of M bits.

The numbers A, B may correspond for example to a text which is enciphered or to be enciphered, a data item which is signed or to be signed, a data item which is verified or to be verified, etc. The number D may correspond to elements of keys, private or public, used for enciphering or deciphering the numbers A, B.

By way of example of the algorithms such as the so-called "Square-And-Multiply" algorithm, the so-called "Right-To-Left binary algorithm" and the so-called "(M, M³) algorithm" may be used for performing exponentiation calculations.

A malevolent user may possibly undertake attacks aimed at discovering in particular confidential information (such as for example the key D or a data item derived from this key) manipulated in processings carried out by the calculation device executing an exponentiation operation.

A simple attack, known as a "timing attack", against the algorithm in FIG. 1 consists in measuring the time necessary for the device to execute a block of instructions between two test steps. If the execution times for the blocks of instructions $\Pi_0$, $\Pi_1$ are different, then it is easy to identify a block of instructions $\Pi_0$ or $\Pi_1$ and to deduce therefrom the value of the associated input variable.

In order to protect against this attack, it is possible to add fictional instructions in the shortest block of instructions $\Pi_0$ or $\Pi_1$ (a block of instructions is "the shortest" if the time taken to perform it is the least) so that the two blocks of instructions $\Pi_0$, $\Pi_1$ are of the same duration.

An instruction is said to be fictional if its execution does not modify the data manipulated by the algorithm. For example, the instruction i←i−0 is a fictional instruction (i is here a loop variable and the notation "←" signifies incrementation, by zero here, of the loop variable).

Though this solution is effective against "timing attacks", it is not effective against other types of covert channel attack and it may also be detrimental to the algorithm execution time.

The most widely known covert channel attacks are the so-called simple or differential ones. Covert channel attack means an attack based on a physical quantity measurable from outside the device and whose direct analysis (simple attack) or analysis according to a statistical method (differential attack) makes it possible to discover information manipulated in processings carried out in the device. For example, in a "timing attack", the covert channel (the physical quantity measurable from the outside) is time.

Covert channel attacks can make it possible to discover confidential information. These attacks were in particular revealed by Paul Kocher (Advances in Cryptology—CRYPTO '99, Vol. 1666 of Lecture Notes in Computer Science, pp. 388-397, Springer-Verlag, 1999).

Amongst the physical quantities which can be exploited for these purposes, there can be cited the execution time, the current consumption, the electromagnetic field radiated by the part of the component used for executing the calculation, etc. These attacks are based on the fact that, during the execution of an algorithm, the manipulation of a bit, that is to say its processing by a particular instruction, leaves a particular imprint on the physical quantity in question, according to the value of this bit and/or according to the instruction.

Covert channel attacks may succeed with algorithms such as the one in FIG. 1 if the blocks of instructions $\Pi_0$, $\Pi_1$ are not equivalent vis-à-vis these attacks.

The term "equivalent" must be understood here and throughout the remainder of the text in the following manner. Two instructions $INST_1$, $INST_2$ (or two blocks of instructions $\Pi_0$, $\Pi_1$) are said to be equivalent ($INST_0$ is denoted $\sim INST_1$) if it is not possible to differentiate them by means of a covert channel attack. This is the case in particular if the physical quantity measured during the attack follows the same development for the two instructions. It should be noted however that two instructions may be equivalent vis-à-vis one covert channel attack and not be equivalent vis-à-vis another covert channel attack.

In the same way, it will be said that two instructions (or blocks of instructions) are equal if, when they are used with the same input data, they produce identical output data.

It is known how to protect against covert channel attacks by adding fictional instructions to the algorithm. It is assumed hereinafter that a fictional instruction is equivalent to a similar real instruction. For example, the instruction i←i−0 is assumed to be equivalent to the instruction i←i−1.

In the case of the algorithm in FIG. 1, it is thus known how to effect a fictional block of instructions $\Pi_1$ after each block of instructions $\Pi_0$, and to effect in a symmetrical manner a fictional block of instructions $\Pi_0$ before each block of instructions $\Pi_1$ (see the steps in dotted lines in FIG. 1). Thus, whatever the value of the input data item, a block of instructions $\Pi_0$ and a block of instructions $\Pi_1$ will be effected, in this order, one or other being fictional, so that it is not possible to predict the value of the input data item, the physical quantities relating to a calculation being equivalent. Thus there is denoted:

$$(\Pi_0 \| \Pi_{1(fictional)}) \sim (\Pi_{0(fictional)} \| \Pi_1).$$

The notation "||" signifies the successive effecting of blocks of instructions $\Pi_0$, $\Pi_1$ (or more generally the successive effecting of two instructions).

Though this solution is effective against covert channel attacks, it does however have the drawback of multiplying on average by two the time needed for executing the algorithm.

This is because, in the case of an unprotected algorithm using M input data (for example the M bits of a data item D), statistically on average M/2 blocks of instructions $\Pi_0$ and M/2 blocks of instructions $\Pi_1$ are effected. If T0 and respectively T1 are the average times for executing a block of instructions $\Pi_0$ or respectively $\Pi_1$, then the average time for executing the unprotected algorithm is equal to M*(T0+T1)/2.

On the other hand, in the case of the algorithm protected by fictional blocks of instructions $\Pi_0$, $\Pi_1$, a block of instructions $\Pi_0$ and a block of instructions $\Pi_1$ are systematically effected for each of the M input data. Consequently the average time for executing the algorithm protected by fictional blocks of instructions is equal to M*(T0+T1).

SUMMARY OF THE INVENTION

A first aim of the invention is to propose a novel cryptographic algorithm protected against covert channel attacks. A second aim of the invention is a protected cryptographic method which is more rapid than existing protected algorithms.

This aim is achieved by a cryptographic calculation method according to the invention, characterised in that, in order to execute a chosen block of instructions ($\Pi_j$) as a function of an input variable ($D_i$) from amongst N predefined blocks of instructions ($\Pi_1, \ldots, \Pi_N$), a block ($\Gamma(k,s)$) common to the N predefined blocks of instructions ($\Pi_1, \ldots, \Pi_N$) is executed a predefined number of times ($L_j$), the predefined number ($L_j$) being associated with the chosen block of instructions ($\Pi_j$).

In other words, according to the invention, a single elementary block, the common elementary block, is effected whatever the input variable. The common elementary block is executed a predefined number of times, according to the input variable. Contrary to the known methods, different blocks of instructions are not executed as a function of the input variable.

Thus, with the invention, it is then not possible to determine, by means of a covert channel attack, which block of instructions is executed. A method according to the invention is therefore well protected.

The predefined number ($L_j$) is variable from one predefined block of instructions ($\Pi_1, \ldots, \Pi_N$) to another.

The common block ($\Gamma(k,s)$) preferably comprises at least one calculation instruction ($\gamma(k,s)$) equivalent vis-à-vis a covert channel attack to a calculation instruction for each predefined block ($\Pi_1, \ldots, \Pi_N$).

The common block ($\Gamma(k,s)$) can also comprise an instruction to update a loop pointer (k) indicating a number of executions already executed of the common block ($\Gamma(k,s)$).

If necessary, the common block ($\Gamma(k,s)$) can additionally comprise an instruction to update a state pointer (s) indicating whether the predefined number ($L_j$) has been reached.

The value of the loop pointer (k) and/or the value of the state pointer (s) are a function of the value of the input variable ($D_i$) and/or of the number of instructions of the instruction block ($\Pi_j$) associated with the value of the input variable.

Preferably, if several common blocks are possible, the common block is chosen so as to be minimum, in the sense that it comprises a minimum number of instructions and/or in that it is effected in a minimum time.

Preferably again, in order to successively effect several blocks of instructions chosen from amongst the N predefined blocks of instructions ($\Pi_1, \ldots, \Pi_N$), each chosen block of instructions being selected as a function of an input variable (Di) associated with an input index (i), the common block ($\Gamma(k,s)$) is executed a total number ($L_T$) of times, the total number ($L_T$) being equal to a sum of the predefined numbers ($L_j$) associated with each chosen block of instructions ($\Pi_j$).

There too, in order to successively execute several blocks of instructions, only the common block is executed an appropriate number of times; this whatever the blocks of instructions to be executed. It is therefore not possible to predict with which block of instructions the common block currently being executed is associated. A covert channel attack can therefore not succeed.

It should be noted that one and the same block of instructions ($\Pi_j$) can be chosen several times according to the input variable (Di) associated with the input index (i).

According to one embodiment of the invention, one or more mathematical relationships are used in order to update the loop pointer and/or the state pointer and/or indices of registers used for implementing the cryptographic method and/or the input variable or variables. According to another embodiment of the invention, the updating takes place using a table with several inputs. These embodiments will be detailed at greater length hereinafter by means of practical examples.

The invention also relates to a method for obtaining a block ($\Gamma(k,s)$) common to N predefined blocks of instructions ($\Pi_1, \ldots, \Pi_N$). The said method is able to be used for implementing a protected cryptographic calculation method according to the invention such as the one described above.

According to the invention, a common block ($\Gamma(k,s)$) is obtained by performing the following steps:

E1: breaking down each predefined block of instructions ($\Pi_1, \ldots, \Pi_N$) into a series of elementary blocks ($\gamma$) equivalent vis-à-vis a covert channel attack, and classifying all the elementary blocks (for example by allocating a rank), E2: seeking a common elementary block ($\gamma(k,s)$) equivalent to all the elementary blocks ($\gamma$) of all the predefined blocks of instructions, E3: seeking a common block ($\Gamma(k,s)$) comprising at least the common elementary block ($\gamma(k,s)$) previously obtained during step E2 and an instruction to update a loop pointer (k) such that an execution of the common elementary block associated with the value of the loop pointer (k) and an execution of the elementary block with a rank equal to the value of the loop pointer (k) are identical.

If necessary, during step E1, one or more fictional instructions can be added to the series of instructions of one or more blocks of instructions. This can facilitate the breaking down of each block of instructions into elementary blocks all equivalent vis-à-vis a covert channel attack.

During step E1, each predefined block of instructions $\Pi_1$ to $\Pi_N$ is divided into elementary blocks which are equivalent vis-à-vis a given attack; the elementary blocks are classified. For example:

$\Pi_1 = \gamma1 || \gamma2 || \gamma3$; $\Pi_2 = \gamma4 || \gamma5$; ....

More generally, each block of instructions $\Pi_1, \ldots, \Pi_N$ is broken down thus:

$\Pi_1 = \gamma(C_1) || \ldots || \gamma(C_1 + L_1 - 1)$,
$\Pi_2 = \gamma(c_2) || \ldots || \gamma(c_2 + L_2 - 1)$,
....
$\Pi_j = \gamma(c_j) || \ldots || \gamma(c_j + L_j - 1)$,
....
$\Pi_N = \gamma(c_N) || \ldots || \gamma(c_N + L_N - 1)$ with $C_1=0$
$C_2=L_1$
....
$C_j=L_1+L_2+\ldots+L_{j-1}$
....
$C_N=L_1+\ldots L_{N-1}$ $L_j$ is the number of elementary blocks necessary for completely breaking down the predefined block of instructions $\Pi_j$.

During step E2, a common elementary block γ is sought such that each block of instructions $\Pi_j$ ($1 \leq j \leq N$) can be expressed in the form of a repetition $L_j$ times of the common elementary block γ.

The common block is preferably chosen so as to be minimum. In other words, it comprises a minimum number of instructions and/or is executed in a minimum time.

During step E3, a common block is sought comprising:
one or more common elementary blocks obtained during step E2, and
an instruction to update a loop pointer (k) such that an execution of the common elementary block associated with the value of the loop pointer (k) and an execution of the elementary block with a rank equal to the value of the loop pointer (k) are identical.

If necessary, a state pointer s can also be used in addition to the loop pointer:
the state pointer s indicates whether the common elementary block has already been executed a predefined number of times corresponding to the number $L_j$ of elementary blocks breaking down a given block of instructions $\Pi_j$; in one example, the state pointer s is equal to 1 when the predefined number $L_j$ of elementary blocks has been executed, and is equal to 0 otherwise;
the loop pointer indicates the rank of the elementary block to be executed amongst all the elementary blocks. In very general terms, the loop pointer can be defined in all cases according to the following Equation 1:

$k \leftarrow (/s) \cdot (k+1) + s \cdot f(D_i)$ $D_i$ is the input variable for selecting a block of instructions to be executed, s is the state pointer, and f is a logic function of the input variable $D_i$ associated with a predefined block of instructions $\Pi_j$ to be executed, and /s is the complement of the pointer s (logic NOT function).

The above equation giving the value k is obtained by means of the following reasoning.

When a block of instructions $\Pi_j$ is effected, the loop pointer k must be incremented by 1 at each execution of the common elementary block (associated with an equivalent elementary block of the breaking down of the block $\Pi_j$) as long as s=0, that is to say as long as the number of elementary blocks associated with the block $\Pi_j$ has not been reached. This is represented by the instruction:

$k \leftarrow (k+1)$ when s=0

Conversely, when the common elementary block associated with the last elementary block of the block $\Pi_j$ (that is to say when s=1) is effected, it is necessary to modify k so as to effect the common elementary block associated with the first elementary block of the following block of instructions $\Pi_{j'}$. This results in the following instruction:

$k \leftarrow f(D_i)$ when s=1 where $D_i$ is the input variable which determines the choice of the calculation $\Pi_j$ to be effected.

By combining the last two instructions, Equation 1 is finally obtained.

The above equation giving the value of k as a function of s is valid in all cases. In certain particular cases, this equation may be modified as will be seen better below in practical examples.

BRIEF DESCRIPTION OF THE DRAWINGS

The invention and the advantages which stem from it will appear more clearly from a reading of the following description of examples of implementation of a protected cryptographic method according to the invention. The description is to be read with reference to the accompanying drawings, in which.

DETAILED DESCRIPTION

Figure 1:
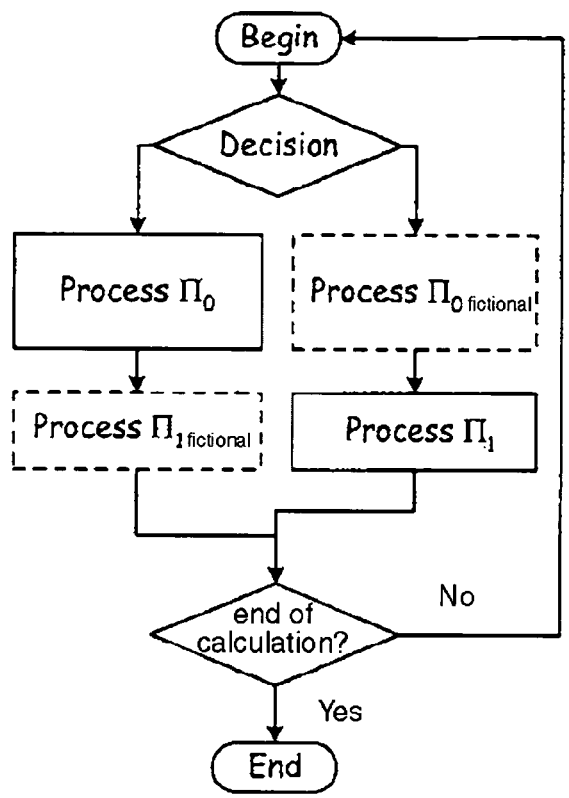
FIG. 1 is a generic diagram of known methods able to be protected according to the invention.
Figure 2:
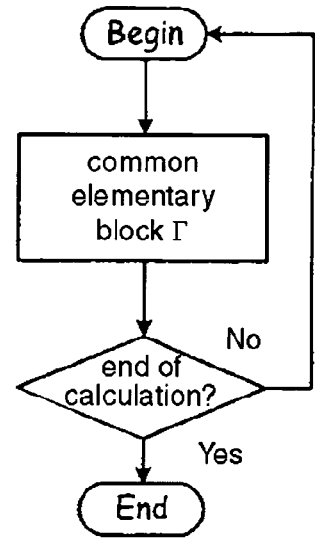
FIG. 2 is a diagram of the generic method of FIG. 1 protected according to the invention, FIGS. 3 and 4 detail the implementation of certain steps of the method of FIG. 2 in the case of known exponentiation methods, protected according to the invention.

In the examples which follow, the obtaining of a common elementary block according to the invention and the use of this elementary block will be described in particular, in the practical cases of cryptographic calculation methods.

Example 1

In a first practical example, an exponentiation algorithm of the "Square-and-Multiply" type is considered, which makes it possible to perform an exponentiation operation of the type $B=A^D$, where $D=(D_{M-1}, \ldots, D_0)$ is a number of M bits. The known form of this algorithm can be represented as follows:

---

Initialisation:
    $R_0 \leftarrow 1; R_1 \leftarrow A; i \leftarrow M-1$
As long as $i \geq 0$, repeat:
    If $D_i = 1$, then effect $\Pi_0$:
        $R_0 \leftarrow R_0 \times R_0$
        $R_0 \leftarrow R_0 \times R_1$
        $i \leftarrow i-1$
    If $D_i = 0$, then effect $\Pi_1$:
        $R_0 \leftarrow R_0 \times R_0$
        $i \leftarrow i-1$
Return $R_0$.

---

Algorithm 1 Non-Protected "Square-and-Multiply"

$R_0$, $R_1$ are registers of a calculation device adapted for implementing the algorithm, and i is a loop index referencing the various bits of D. According to the value $D_i$, $\Pi_j=\Pi_0$ or $\Pi_j=\Pi_1$ is executed.

In Algorithm 1, the blocks of instructions $\Pi_0$, $\Pi_1$ are effected according to the value of a bit $D_i$ of the exponent D, and the loop index i is decremented at the end of each block of instructions $\Pi_0$, $\Pi_1$ so as to successively process all the bits $D_i$ of D.

In Algorithm 1, the blocks of instructions $\Pi_0$, $\Pi_1$ are not equivalent vis-à-vis a covert channel attack, in particular because the number of instructions of $\Pi_0$ is different from the number of instructions of $\Pi_1$.

In order to protect Algorithm 1 according to the invention, a common elementary block Γ able to be used for executing the blocks $\Pi_0$, $\Pi_1$ is sought.

For this purpose, each block of instructions $\Pi_0$, $\Pi_1$ is first of all broken down into a series of elementary blocks, all equivalent to each other vis-à-vis a given attack.

The block of instructions $\Pi_0$ can be written:
$R_0 \leftarrow R_0 \times R_0$
$i \leftarrow i-0$
$R_0 \leftarrow R_0 \times R_1$
$i \leftarrow i-1$ The instruction $i \leftarrow i-0$ is fictional: it does not modify any variable, any data item manipulated by Algorithm 1.

$\Pi_0$ can then be broken down into two elementary blocks:
$\Pi_0 = \gamma_0 \| \gamma 1$ with
$\gamma 0$: $R_0 \leftarrow R_0 \times R_0$
  $i \leftarrow i-0$
$\gamma 1$: $R_0 \leftarrow R_0 \times R_1$
  $i \leftarrow i-1$ $\Pi_1$ is broken down in the same way into an elementary block:
$\Pi_1 = \gamma 2$ with
$\gamma 2$: $R_0 \leftarrow R_0 \times R_0$
  $i \leftarrow i-1$ It should be noted that the blocks $\gamma 0$, $\gamma 1$, $\gamma 2$ are all equivalent ($\gamma 0 \sim \gamma 1 \sim \gamma 2$) vis-à-vis a covert channel attack if it is assumed that the instructions $R_0 \leftarrow R_0 \times R_0$ and $R_0 \leftarrow R_0 \times R_1$ are equivalent and that the instructions $i \leftarrow i-0$ and $i \leftarrow i-1$ are equivalent.

Thus each block of instructions $\Pi_0$, $\Pi_1$ has been broken down into a variable number of elementary blocks (variable from one block of instructions to another), all equivalent to each other.

Next a state pointer s and a rank pointer k are defined. When a block of instructions $\Pi_j$ is in the course of execution:

k is used to indicate which elementary block $\gamma k$ is to be effected; the value of k depends in particular on the block $\Pi_j$ currently being executed (and therefore on the input variable $D_i$ tested) and the state of advancement of the execution of the block $\Pi_j$ s is used to indicate whether at least one elementary block $\gamma k$ is yet to be effected or whether the current block $\gamma k$ is the last of the block of instructions $\Pi_j$.

In the case of the above example relating to Algorithm 1, the development of the pointers k, s can be summarised by the following table.

TABLE 1

| | | k | s |
|---|---|---|---|
| ($D_i = 1$) | $\gamma 0$: $R_0 \leftarrow R_0 \times R_0$; $i \leftarrow i-0$ | 0 | 0 |
| | $\gamma 1$: $R_0 \leftarrow R_0 \times R_1$; $i \leftarrow i-1$ | 1 | 1 |
| ($D_i = 0$) | $\gamma 2$: $R_0 \leftarrow R_0 \times R_0$; $i \leftarrow i-1$ | 2 | 1 | s can be calculated from k: if the elementary block $\gamma k$ which is to be effected is the last elementary block of a block $\Pi$, then s=1, otherwise s=0.

In the case of Algorithm 1, it is possible for example to calculate s by means of the following equation:

$$s = (k \bmod 2) + (k \text{ div } 2) \quad \text{(EQ a)}$$

"div" designates an integer division and "mod" a modular reduction. From Equation 1, the various values of s as a function of k are found (cf Table 1).

The updating of k can be obtained from s and $D_i$, $D_j$ representing the current block $\Pi_j$:

if s=0 (block $\Pi_j$ currently being effected), k is incremented by 1 at each effecting of an elementary block $\gamma$, in order then to effect the following elementary block $\gamma$.

if s=1, the current block $\Pi$ is terminated and the following elementary block $\gamma$ to be effected is the first elementary block of the next block $\Pi_j$ to be executed; k therefore depends on $D_i$.

From the above, it is deduced therefrom that k can be obtained by the following relationship:

$$k \leftarrow (/s) \times (k+1) + s \times f(D_i) \quad \text{(EQ b)}$$

Figure 3:
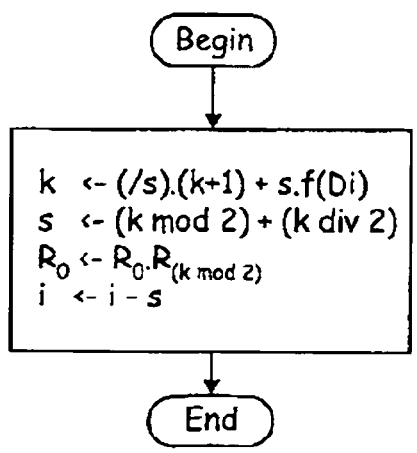

/s is the complementary value of s (logic NOT function), and f is a logic function of $D_i$, which depends on the algorithm to be protected (see also FIG. 3).

In the case of Algorithm 1, it is possible for example to choose $f(D_i) = 2 \times (/D_i)$.

Thus, with Equation 3:

$$k \leftarrow (/s) \times (k+1) + s \times 2 \times (/D_i) \quad \text{(EQ c)}$$

the various values of k are found as a function of s and $D_i$ (cf Table 1).

Finally, a common elementary block $\gamma(k,s)$, is defined, equivalent to the elementary blocks $\gamma 0$, $\gamma 1$, $\gamma 2$ and such that $\gamma(0,0) = \gamma 0$, $\gamma(1,1) = \gamma 1$ and $\gamma(2,1) = \gamma 2$.

For Algorithm 1, it is possible for example to choose:
$\gamma(k,s)$: $R_0 \leftarrow R_0 \times R_{k \bmod 2}$
$i \leftarrow i-s$ Using the common elementary block $\gamma(k,s)$, Algorithm 1 can finally be written (see also FIG. 3):

Initialisation:
$R_0 \leftarrow 1$; $R_1 \leftarrow A$; $i \leftarrow M-1$
As long as $i \geq 0$, repeat the common block $\Gamma(k,s)$:
$k \leftarrow (/s) \times (k+1) + s \times 2 \times (/D_i)$
$s \leftarrow (k \bmod 2) + (k \text{ div } 2)$
$\gamma(k,s)$: $R_0 \leftarrow R_0 \times R_{k \bmod 2}$
  $i \leftarrow i-s$
Return $R_0$.
Protected Algorithm 1
(Protected "Square-and-Multiply" Algorithm)

In this algorithm, a single common block $\Gamma(k,s)$ is used, whatever the values of $D_i$. In other words, whatever the value of $D_i$, the same instruction or the same block of instructions is executed. In the case where $D_i = 0$, the block $\Gamma(k,s)$ is executed only once. In the case where $D_i = 1$, the common block $\Gamma(k,s)$ is executed successively twice.

Whatever the values of the pointers k, s and whatever the value of $D_i$, the associated block $\Gamma(k,s)$ is equivalent, vis-à-vis a covert channel attack, to the block $\Gamma(k,s)$ previously executed and to the block $\Gamma(k,s)$ next executed. Consequently it is not possible to distinguish them from each other and it is not possible to know to which block of instructions $\Pi_j$ the common block $\Gamma(k,s)$ currently being executed corresponds.

It should be noted that, with respect to the non-protected Algorithm 1, the protected Algorithm 1 according to the invention uses the same number of calculation instructions (such as multiplication instructions for example) in order to arrive at the same final result. The protected Algorithm 1 according to the invention simply comprises additional steps of updating pointers: such steps are much more rapid and consume much fewer resources than a calculation instruction such as a multiplication. Consequently the time for executing the protected algorithm is almost the same as that of the non-protected Algorithm 1: Tex=1.5*M*T0, T0 being the time for executing a multiplication.

It should also be noted that the common block $\Gamma(k,s)$ is not unique for one and the same algorithm, as will be seen with Example 2.

Example 2

In the case of the "Square and Multiply" algorithm, other breakdowns of the block of instructions $\Pi_0$ can be envisaged, for example:

$\Pi_0 = \gamma'0 \| \gamma'1$ with $\gamma'0$: $R_0 \leftarrow R_0 \times R_0$
 $i \leftarrow i-1$ $\gamma'1$: $R_0 \leftarrow R_0 \times R_1$
 $i \leftarrow i-0$ This breakdown can be envisaged since the fictional instruction $i \leftarrow i-0$ can be executed at any time during the block $\Pi_0$. It is consequently found that the elementary blocks $\gamma'0$ and $\gamma 2$ are identical. Table 1 is then modified in the following manner.

TABLE 2

|  |  | k | s |
|---|---|---|---|
| ($D_i = 1$) | $\gamma'0$: $R_0 \leftarrow R_0 \times R_0$; $i \leftarrow i-1$ | 0 | 0 |
|  | $\gamma'1$: $R_0 \leftarrow R_0 \times R_1$; $i \leftarrow i-0$ | 1 | 1 |
| ($D_i = 0$) | $\gamma'0$: $R_0 \leftarrow R_0 \times R_0$; $i \leftarrow i-1$ | 0 | 1 |

Figure 4:
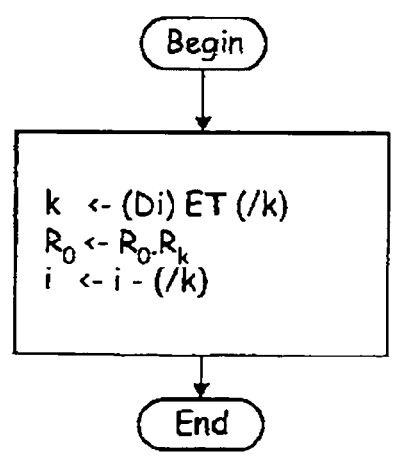

The pointer s here becomes superfluous since only two elementary blocks are possible, $\gamma'0$ and $\gamma'1$. Finally, the common elementary block $\gamma'(k,s)$ and the following protected algorithm are obtained (see also FIG. 4):

Initialisation:

$R_0 \leftarrow 1$; $R_1 \leftarrow A$; $i \leftarrow M-1$; $k \leftarrow 1$

As long as $i \geq 0$, repeat the common block $\Gamma'(k,s)$:

$k \leftarrow (D_i)$ AND $(/k)$ $\gamma'(s,k)$: $R_0 \leftarrow R_0 \times R_k$
 $i \leftarrow i-(/k)$ Return $R_0$.

Protected Algorithm 2

(Protected "Square-And-Multiply" Algorithm, Version 2)

Example 3

The exponentiation algorithm known as the "Right-To-Left binary algorithm" is fairly similar to the "Square-And-Multiply" algorithm. It makes it possible to perform an operation of the type $B = A^D$, starting from the least significant bit of D in the following manner:

Initialisation:
 $R_0 \leftarrow 1$; $R_1 \leftarrow A$; $i \leftarrow 0$
As long as $i \leq M-1$, repeat:
 If $D_i = 1$, then effect the block $\Pi_0$:
  $R_0 \leftarrow R_0 \times R_1$
  $R_1 \leftarrow R_1 \times R_1$
  $i \leftarrow i+1$
 If $D_i = 0$, then effect the block $\Pi_1$:
  $R_1 \leftarrow R_1 \times R_1$
  $i \leftarrow i+1$
Return $R_0$.

So-Called "Right-to-Left Binary Algorithm"

The blocks $\Pi_0$, $\Pi_1$ in this example can be broken down in the following manner:

TABLE 3

|  |  | k | s |
|---|---|---|---|
| $\Pi_0$ ($D_i = 1$) | $\gamma 0$: $R_0 \leftarrow R_0 \times R_1$; $i \leftarrow i+0$ | 0 | 0 |
|  | $\gamma 1$: $R_1 \leftarrow R_1 \times R_1$; $i \leftarrow i+1$ | 1 | 1 |
| $\Pi_1$ ($D_i = 0$) | $\gamma 0$: $R_1 \leftarrow R_1 \times R_1$; $i \leftarrow i+1$ | 0 | 1 |

Here also, as only two elementary blocks $\gamma 0$, $\gamma 1$ are used to break down $\Pi_0$, $\Pi_1$, the pointer s is unnecessary. It is possible for example to choose the following common elementary block $\gamma(k)$:

$\gamma(k)$: $R_k \leftarrow R_k \times R_1$
 $i \leftarrow i+k$ and to update the pointer k before each effecting of the block $\gamma(k)$ using the instruction $k \leftarrow k \oplus D_i$, where $\oplus$ designates the exclusive-OR operator ($\oplus$) Finally the following protected Algorithm 3 is obtained:

Initialisation:

$R_0 \leftarrow 1$; $R_1 \leftarrow A$; $i \leftarrow 0$; $k \leftarrow 1$

As long as $i \leq M-1$, repeat the block $\Gamma(k,s)$:

$k \leftarrow k \oplus D_i$ $\gamma(k)$: $R_k \leftarrow R_k \times R_1$
 $i \leftarrow i+k$ Return $R_0$.

Algorithm 3

(Protected "Right-To-Left Binary Algorithm")

The above examples describe algorithms during which only two blocks of instructions $\Pi_0$ or $\Pi_1$ are executed as a function of the value of an input variable $D_i$. The invention can however apply to algorithms using more than two blocks of instructions $\Pi$.

Example 4

In this example the so-called "(M, M³) algorithm" is considered, known in the following form:

Initialisation:
 $R_0 \leftarrow 1$; $R_1 \leftarrow A$; $R_2 \leftarrow A^3$;
 $D_{-1} \leftarrow 0$; $i \leftarrow M-1$ As long as $i \geq 0$, repeat:
 If $D_i = 0$, effect $\Pi_0$:
  $R_0 \leftarrow (R_0)^2$
  $i \leftarrow i-1$
 If $D_i = 1$ AND ($D_{i-1} = 0$), effect $\Pi_1$:
  $R_0 \leftarrow (R_0)^2$
  $R_0 \leftarrow R_0 \times R_1$
  $i \leftarrow i-1$
 If $D_i = 1$ AND ($D_{i-1} = 1$), effect $\Pi_2$:
  $R_0 \leftarrow (R_0)^2$
  $R_0 \leftarrow (R_0)^2$
  $R_0 \leftarrow R_0 \times R_2$
  $i \leftarrow i-2$
Return $R_0$.

So-Called "(M, M³) Algorithm"

AND is the logic AND function. $R_0$, $R_1$, $R_2$ are registers of the device used for implementing the algorithm.

By replacing the $(R_0)^2$ type squares with $R_0 \times R_0$ type multiplications, and introducing fictional instructions of the type $i \leftarrow i-0$, it is possible to break down the algorithm (M, M³) according to the table:

TABLE 4

|  |  | k | s |
|---|---|---|---|
| $\Pi_0$ ($D_i = 0$) | $\gamma 0: R_0 \leftarrow R_0 \times R_0; i \leftarrow i - 1$ | 0 | 1 |
| $\Pi_1$ ($D_i = 1$) and ($D_{i-1} = 0$) | $\gamma 1: R_0 \leftarrow R_0 \times R_0; i \leftarrow i - 0$ | 1 | 0 |
|  | $\gamma 2: R_0 \leftarrow R_0 \times R_1; i \leftarrow i - 1$ | 2 | 1 |
| $\Pi_s$ ($D_i = 1$) and ($D_{i-1} = 1$) | $\gamma 3: R_0 \leftarrow R_0 \times R_0; i \leftarrow i - 0$ | 3 | 0 |
|  | $\gamma 4: R_0 \leftarrow R_0 \times R_0; i \leftarrow i - 0$ | 4 | 0 |
|  | $\gamma 5: R_0 \leftarrow R_0 \times R_2; i \leftarrow i - 2$ | 5 | 1 |

Table 4 makes it possible to fairly easily calculate the value of the pointer k as a function of s and $D_i$, and the value of the pointer s as a function of k, as before. Moreover, the blocks $\gamma 0$ to $\gamma 5$ are all equivalent vis-à-vis a covert channel attack, and it is possible to choose for example the following common elementary block $\gamma(k,s)$:

$\gamma(k,s): R_0 \leftarrow R_0 \times R_{s \times (k \text{ div } 2)}$
 $i \leftarrow i - s \times (k \text{ mod } 2 + 1)$ Finally, a protected Algorithm 4 is derived from this:
Initialisation:
$R_0 \leftarrow 1; R_1 \leftarrow A,; R_2 \leftarrow A^3;$
$D_{-1} \leftarrow 0; i \leftarrow M - 1; s \leftarrow 1$
As long as $i \geq 0$, repeat the block $\Gamma(k,s)$:
$k \leftarrow (/s) \times (k+1) + s \times (D_i + 2 \times (D_i \text{ AND } D_{i-1}))$
$s \leftarrow /((k \text{ mod } 2) \oplus (k \text{ div } 4))$
$\gamma(k,s): R_0 \leftarrow R_0 \times R_{s \times (k \text{ div } 2)}$
 $i \leftarrow i - s \times (k \text{ mod } 2 + 1)$
Return $R_0$.
Algorithm 4
(Protected Algorithm (M, M³), Version 1)

Example 5

As seen in the context of Examples 1 and 2, for one and the same algorithm it is possible to choose between several common elementary blocks $\gamma(k)$ or $\gamma(k,s)$.

In the case of the (M, M³) algorithm for example, it is also possible to break down the blocks $\Pi_0, \Pi_1, \Pi_2$ in the following manner:

TABLE 5

|  |  | k | s |
|---|---|---|---|
| $\Pi_0$ ($D_i = 0$) | $\gamma 0: R_0 \leftarrow R_0 \times R_0; i \leftarrow i - 1$ | 0 | 1 |
| $\Pi_1$ ($D_i = 1$) and ($D_{i-1} = 0$) | $\gamma 1: R_0 \leftarrow R_0 \times R_0; i \leftarrow i - 0$ | 0 | 0 |
|  | $\gamma 2: R_0 \leftarrow R_0 \times R_1; i \leftarrow i - 1$ | 1 | 1 |
| $\Pi_s$ ($D_i = 1$) and ($D_{i-1} = 1$) | $\gamma 3: R_0 \leftarrow R_0 \times R_0; i \leftarrow i - 0$ | 0 | 0 |
|  | $\gamma 4: R_0 \leftarrow R_0 \times R_0; i \leftarrow i - 0$ | 1 | 0 |
|  | $\gamma 5: R_0 \leftarrow R_0 \times R_2; i \leftarrow i - 2$ | 2 | 1 |

Compared with Table 4, only the values of k have been modified.

Table 5 makes it possible to calculate, as before, the value of the pointer k as a function of s and $D_i$, the value of the pointer s as a function of k, and the value by which the index i must be decremented. Moreover, it is possible for example to choose the following common elementary block $\gamma(k,s)$:

$\gamma(k,s): R_0 \leftarrow R_0 \times R_{k \times s}$
 $i \leftarrow i - k \times s - (/Di)$ Finally, a protected Algorithm 5 is derived therefrom:
Initialisation:
$R_0 \leftarrow 1; R_1 \leftarrow A; R_2 \leftarrow A^3;$
$D_{-1} \leftarrow 0; i \leftarrow M - 1; s \leftarrow 1$
As long as $i \geq 0$, repeat:
$k \leftarrow (/s) \times (k+1)$
$s \leftarrow s \oplus D_i \oplus ((D_{i-1} \text{ AND } (k \text{ mod } 2))$
$\Gamma(k,s): R_0 \leftarrow R_0 \times R_{k \times s}$
 $i \leftarrow i - k \times s - (/D_i)$
Return $R_0$.
Algorithm 5
(Protected Algorithm (M, M³), Version 2)

As has been seen in the above examples, it is fairly simple to obtain, in the context of the invention, a breakdown of each block $\Pi_j$ of instructions into elementary blocks $\gamma 0, \gamma 1, \ldots, \gamma L_j$.

However, the relationships linking the loop pointer k and the state pointer s to the variable $D_i$ and/or to the variable j indexing the various blocks $\Pi_0, \Pi_j, \ldots, \Pi_N$ become complex when the algorithm which it is sought to protect is itself complex (that is to say when it uses a large number of different blocks $\Pi_j$, when each block $\Pi_j$ is broken down into a large number of elementary blocks $\gamma$, etc). For certain particularly complex algorithms such as cryptographic algorithms on elliptic curves, this difficulty can even prove to be great or even insurmountable.

In order to resolve or get around this difficulty, according to another embodiment of the invention, the links between the values of the loop pointer k, the state pointer s, the index of the registers used, the index i of the variable D and the index j of the blocks $\Pi_j$, are expressed in the form of a Table U with several inputs, as will be seen in the examples below.

In the practical implementation of the invention, the so-called Table U can for example be stored in a memory, erasable or not, of the device used. The updating of the pointers will then be effected by a reading in the memory of one or more values in the matrix U.

Example 6

The breakdown of the "Square and Multiply" algorithm into elementary blocks is considered once again:

Table 6 = Table 2

|  |  | k | s |
|---|---|---|---|
| ($D_i = 1$) | $\gamma 0: R_0 \leftarrow R_0 \times R_0; i \leftarrow i - 0$ | 0 | 0 |
|  | $\gamma 1: R_0 \leftarrow R_0 \times R_1; i \leftarrow i - 1$ | 1 | 1 |
| ($D_i = 0$) | $\gamma 2: R_0 \leftarrow R_0 \times R_0; i \leftarrow i - 1$ | 2 | 1 |

A different value of k corresponds to each line in Table 6. Each elementary block $\gamma_k$ can be written in the following form:

$\gamma_k = [R_{U(k,0)} \leftarrow R_{U(k,1)} \times R_{U(k,2)}; i \leftarrow i - U(k,3)]$ where U(k,1) is the element of the line k and of column 1 in the following matrix:

$$(U_{k,l}) \begin{array}{c} 0 \leq k \leq 2 \\ 0 \leq l \leq 3 \end{array} = \begin{pmatrix} 0 & 0 & 0 & 0 \\ 0 & 0 & 1 & 1 \\ 0 & 0 & 0 & 1 \end{pmatrix}$$

The matrix U is constructed in the following manner. Each row of the matrix corresponds to an elementary block $\gamma k$ of index k. With each column there is associated an index liable to vary from one elementary block $\gamma k$ to another. Here the Column 0 is associated with the index of the register in which the result of the instruction $R_\alpha \leftarrow R_\alpha \times R_\beta$ ($\alpha, \beta$ are equal to 0 or 1 here) is stored. Column 1 and Column 2 are associated with the indices of the registers whose product is effected by the instruction $R_\alpha \leftarrow R_\alpha \times R_\beta$. Finally, Column 3 is associated with the variations of the index i. The matrix U is thus obtained very simply from the table summarising the breakdown of the blocks $\Pi_j$ into elementary blocks $\gamma k$.

The constant columns of the matrix being of no interest, they can be eliminated in order to give a reduced matrix, easier to store and to use. In this way the common elementary block $\gamma(k)$ is obtained:

$$\gamma(k)=[R_0 \leftarrow R_0 \times R_{U(k,0)}; i \leftarrow i-U(k,1)]$$

with, for $0 \leq k \leq 2$ and $0 \leq 1 \leq 1$:

$$(U(k,1)) \begin{array}{c} 0 \leq k \leq 2 \\ 0 \leq 1 \leq 1 \end{array} = \begin{pmatrix} 0 & 0 \\ 1 & 1 \\ 0 & 1 \end{pmatrix}$$

Finally the complete protected algorithm according to the invention is derived from this.

Initialisation:

$R_0 \leftarrow 1; R_1 \leftarrow A; i \leftarrow M-1; s \leftarrow 1$

As long as $i \geq 0$, repeat the block $\Gamma(k,s)$:

$k \leftarrow (/s) \times (k+1) + s \times 2 \times (/D_i)$ $s \leftarrow U(k,1)$ $\gamma(k,s): R_0 \leftarrow R_0 \times R_{U(k,0)}$ $i \leftarrow i-s$ Return $R_0$.

Algorithm 6

(Protected "Square and Multiply", Version 3)

The use of a matrix is a very general method, much more general than the empirical relationships used in Examples 1 to 5 for explaining the links between the various indices used.

The expression of the links between the indices in the form of a matrix with several inputs has the advantage of being much simpler to implement and in particular being usable for all known cryptographic algorithms, including the most complex, as will be seen in a few examples of cryptographic calculation algorithms on elliptic curves (Examples 8 and 9).

Example 7

Here the algorithm (M, M3) and its breakdown table are considered once again:

| Table 7 = Table 4 | | k | s |
|---|---|---|---|
| $\Pi_0$ ($D_i = 0$) | $\gamma 0: R_0 \leftarrow R_0 \times R_0; i \leftarrow i-1$ | 0 | 1 |
| $\Pi_1$ ($D_i = 1$) and ($D_{i-1} = 0$) | $\gamma 1: R_0 \leftarrow R_0 \times R_0; i \leftarrow i-0$ | 1 | 0 |
| | $\gamma 2: R_0 \leftarrow R_0 \times R_1; i \leftarrow i-1$ | 2 | 1 |
| $\Pi_s$ ($D_i = 1$) and ($D_{i-1} = 1$) | $\gamma 3: R_0 \leftarrow R_0 \times R_0; i \leftarrow i-0$ | 3 | 0 |
| | $\gamma 4: R_0 \leftarrow R_0 \times R_0; i \leftarrow i-0$ | 4 | 0 |
| | $\gamma 5: R_0 \leftarrow R_0 \times R_2; i \leftarrow i-2$ | 5 | 1 |

From Table 7, the following matrix is easily derived:

$$(U(k,1)) \begin{array}{c} 0 \leq k \leq 5 \\ 0 \leq 1 \leq 2 \end{array} = \begin{pmatrix} 0 & 1 & 1 \\ 0 & 0 & 0 \\ 1 & 1 & 1 \\ 0 & 0 & 0 \\ 0 & 0 & 0 \\ 2 & 2 & 1 \end{pmatrix}$$

one possible expression of a common elementary block $\gamma(k)$:

$$\gamma(k)=[R_0 \leftarrow R_0 \times R_{U(k,0)}; i \leftarrow i-R_{U(k,1)}]$$

and a protected algorithm using the common elementary block $\gamma(k)$:

Initialisation:

$R_0 \leftarrow 1; R_1 \leftarrow A; R_2 \leftarrow A^3;$ $i \leftarrow M-1; s \leftarrow 1$ As long as $i \geq 0$, repeat the common block $\Gamma(k,s)$:

$k \leftarrow (/s) \times (k+1) + s \times (D_i + 2 \times (/D_i \text{ AND } D_{i-1}));$ $s \leftarrow U(k,2)$ $\gamma(k,s): R_0 \leftarrow R_0 \times R_{U(k,0)};$ $i \leftarrow i-U(k,1)$ Return $R_0$.

Algorithm 7

(Protected Algorithm (M, $M^3$), Version 3)

Example 8

A cryptographic calculation algorithm on a non-supersingular elliptic curve E defined on a binary field $F_2q$ by the following Weierstrass equation:

$$E/F_2q: Y^2 + X \times Y = X^3 + a \times X^2 + b \quad \text{(EQ d)}$$

where X, Y are the affine coordinates of a point P on the curve E.

The basic operations of a cryptographic algorithm on elliptic curves are the operations of doubling of points and the operations of addition of two distinct points.

The operation of doubling of a point is defined by:

$$P3(X3, Y3) = 2 \times P1(X1, Y1) \text{ with}$$

$X3 = a + \lambda^2 + \lambda$ $Y3 = (X1+X3) \times \lambda + X3 + Y1$ and $\lambda = X1 + (Y1/X1)$ The operation of addition of two distinct points is defined by:

$$P(X3, Y3) = P1(X1, Y1) + P2(X2, Y2)$$

$X3 = a + \lambda^2 + \lambda + X1 + X2$ $Y3 = (X1+X3) \times \lambda + X3 + Y1$ and $\lambda = (Y1+Y2)/(X1+X2)$ In Table 8, the operation of doubling of points and the operation of addition of two distinct points have been broken down in the form each of an equivalent elementary block $\gamma 0$, $\gamma 1$ (the same operations are used, possibly on different registers):

TABLE 8

| | | k | s |
|---|---|---|---|
| $\gamma 0:$ | $R_1 \leftarrow R_1 + R_3; R_2 \leftarrow R_2 + R_4; R_5 \leftarrow R_2/R_1;$ | 0 | 1 |
| | $R_1 \leftarrow R_1 + R_5; R_6 \leftarrow R_5^2;$ | | |
| | $R_6 \leftarrow R_6 + a; R_1 \leftarrow R_1 + R_6; R_2 \leftarrow R_1 + R4;$ | | |
| | $R_6 \leftarrow R_1 + R_3; R_5 \leftarrow R_5 \times R6; R_2 \leftarrow R_2 + R_5$ | | |

TABLE 8-continued

|  | k | s |
|---|---|---|
| γ1: $R_6 \leftarrow R_1 + R_3$; $R_6 \leftarrow R_6 + R_3$; $R_5 \leftarrow R_2/R_1$; $R_5 \leftarrow R_1 + R_5$; $R_1 \leftarrow R_5^2$; $R_1 \leftarrow R_1 + a$; $R_1 \leftarrow R_1 + R_5$; $R_2 \leftarrow R_1 + R_2$; $R_6 \leftarrow R_1 + R_6$; $R_5 \leftarrow R_5 \times R_6$; $R_2 \leftarrow R_2 + R_5$ | 1 | 1 |

From Table 8, the following matrix is derived:

$$(U(k,1)) \begin{matrix} 0 \leq k \leq 1 \\ 0 \leq 1 \leq 7 \end{matrix} = \begin{pmatrix} 1 & 2 & 4 & 1 & 6 & 6 & 4 & 3 \\ 6 & 6 & 3 & 5 & 1 & 5 & 2 & 6 \end{pmatrix}$$

The matrix comprises only two rows since only two different elementary blocks are used. The matrix comprises 8 columns, each associated with a register index varying from one row to another. Column 0 is thus associated with the index of the register (R1 or R6) in which the result of the first operation (R1+R3) is stored, Column 1 is associated with the index of the register (R2 or R6) in which the result of the second operation ($R_2+R_4$ or $R_6+R_3$) is stored, Columns 1 and 2 are associated with the registers whose contents are added during the second operation ($R_2+R_4$ or $R_6+R_3$), etc.

The matrix is to be used with the following common elementary block:

γ(k): $R_{U(k,0)} \leftarrow R_1+R_3$; $R_{U(k,1)} \leftarrow R_{U(k,1)}+R_{U(k,2)}$;
$R_5 \leftarrow R_2/R_1$; $R_{U(k,3)} \leftarrow R_1+R_5$;
$R_{U(k,4)} \leftarrow R_5^2$;
$R_{U(k,4)} \leftarrow R_{U(k,4)}+a$; $R_1 \leftarrow R_1+R_{U(k,5)}$;
$R_2 \leftarrow R_1+R_{U(k,6)}$; $R_6 \leftarrow R_1+R_{U(k,7)}$;
$R_5 \leftarrow R_5 \cdot R_6$; $R_2 \leftarrow R_2+R_5$ in order to effect a protected algorithm using the common block Γ(k) in a loop of the "repeat as long as" type and performing a complex operation using basic operations (doubling of points and/or addition of points)

Initialisation:
$R_1 \leftarrow X_1$; $R_2 \leftarrow Y_1$;
$R_3 \leftarrow X_1$; $R_4 \leftarrow Y_1$;
i←m−2; s←−1; k←0;
As long as i≧0, repeat Γ(k,s):
γ(k)
s←k−$D_i$+1
k←(k+1)×(/s);
i←i−s;
Return (R1, R2)
Algorithm 8
(Protected Algorithm on Elliptic Curve)

The invention claimed is:

1. A method for implementing a cryptographic calculation in an electronic device, comprising the following steps:
   selecting a block of instructions from amongst a plurality of predefined blocks of instructions, as a function of an input variable; and
   executing, in the electronic device, a set of instructions that is common to the plurality of predefined blocks of instructions a predefined number of times, wherein said predefined number is associated with the selected block of instructions.

2. A method according to claim 1, wherein the predefined number is variable from one block of instructions to another.

3. A method according to claim 1, wherein the common set of instructions comprises at least one calculation instruction that is equivalent to a calculation instruction of each predefined block in the context of a covert channel attack.

4. A method according to claim 3, in which the common set of instructions also comprises an instruction to update a loop pointer indicating a number of executions already performed with the common set of instructions.

5. A method according to claim 4 wherein the value of the loop pointer is a function of the value of the input variable and/or of the number of instructions in the selected block of instructions.

6. A method according to claim 3 wherein the common set of instructions also comprises an instruction to update a state pointer indicating whether the predefined number has been reached.

7. A method according to claim 6, wherein the value of the state pointer is a function of the value of the input variable and/or of the number of instructions in the selected block of instructions.

8. A method according to claim 1, wherein, in order to successively effect several blocks of instructions chosen from amongst the plural predefined blocks of instructions, each selected block of instructions is selected as a function of an input variable associated with an input index, and
   the common set of instructions is executed a total number of times equal to a sum of the predefined numbers associated with each selected block of instructions.

9. A method according to claim 8 wherein one and the same block of instructions is selected several times according to the input variable associated with the input index.

10. A method according to claim 8, wherein at least two of the following data items, (a) the value of a loop pointer, (b) the value of a state pointer, (c) the value of the input variable, and (d) the number of instructions of the selected block of instructions, are linked by one or more mathematical functions.

11. A method according to claim 10, used in the implementation of an exponentiation calculation of the type $B=A^D$, with D being an integer number of M bits, and each bit ($D_i$) of D corresponding to an input variable of input index i, comprising the following steps:

Initialisation:
$R_0 \leftarrow 1$; $R_1 \leftarrow A$; i←M−1
As long as i≧0, repeat the common set of instructions:
k←(/s)×(k+1)+s×2×(/$D_i$)
s←(k mod 2)+(k div 2)
γ(k,s): $R_0 \leftarrow R_0 \times R_k$ mod 2
i←i−s
Return $R_0$,
where $R_0$ and $R_1$ are values stored in two registers, respectively,
k is a loop pointer indicating a number of executions performed with the common set of instructions, and
s is a state pointer indicating whether the predefined number has been reached.

12. A method according to claim 10, used in the implementation of an exponentiation calculation of the type $B=A^D$, with D being an integer number of M bits, and each bit ($D_i$) of D corresponding to an input variable of input index i, comprising the following steps:

Initialisation:
$R_0 \leftarrow 1$; $R_1 \leftarrow A$; i←M−1; k←1
As long as i≧0 repeat the common set of instructions:
k←(Di) AND (/k)
γ'(s,k): $R_0 \leftarrow R_0 \times R_k$
i←i−(/k)
Return $R_0$,
where $R_0$ and $R_1$ are values stored in two registers, respectively, k is a loop pointer indicating a number of executions performed with the common set of instructions, and s is a state pointer indicating whether the predefined number has been reached.

13. A method according to claim 10, used in the implementation of an exponentiation calculation of the type $B=A^D$, with D being an integer number of M bits, and each bit ($D_i$) of D corresponding to an input variable of input index i, comprising the following steps:

Initialisation:
$R_0 \leftarrow 1; R_1 \leftarrow A; i \leftarrow 0; k \leftarrow 1$
As long as $i \leq M-1$, repeat the common set of instructions:
$k \leftarrow k \oplus D_i$
$\gamma(k): R_k \leftarrow R_k \times R_1$
$i \leftarrow i+k$
Return R0,
where R0 and R1 are values stored in two registers, respectively, and
k is a loop pointer indicating a number of executions performed with the common set of instructions.

14. A method according to claim 10, used in the implementation of an exponentiation calculation of the type $B=A^D$, with D being an integer number of M bits, and each bit ($D_i$) of D corresponding to an input variable of input index i, comprising the following steps:

Initialisation:
$R_0 \leftarrow 1; R_1 \leftarrow A; R_2 \leftarrow A^3;$
$D_{-1} \leftarrow 0; i \leftarrow M-1; s \leftarrow 1$
As long as $i \geq 0$, repeat the common set of instructions:
$k \leftarrow (/s) \times (k+1) + s \times (D_i + 2 \times (D_i \text{ AND } D_{i-1}))$
$s \leftarrow /((k \bmod 2) \oplus (k \text{ div } 4))$
$\gamma(k,s): R_0 \leftarrow R_0 \times R_{s \times (k \text{ div } 2)}$
$i \leftarrow i - s \times (k \bmod 2 + 1)$
Return $R_0$,
where $R_0$ and $R_1$ are values stored in two registers, respectively,
k is a loop pointer indicating a number of executions performed with the common set of instructions, and
s is a state pointer indicating whether the predefined number has been reached.

15. A method according to claim 10, used in the implementation of an exponentiation calculation of the type $B=A^D$, with D being an integer number of M bits, and each bit ($D_i$) of D corresponding to an input variable of input index i, comprising the following steps:

Initialisation:
$R_0 \leftarrow 1; R_1 \leftarrow A; R_2 \leftarrow A^3;$
$D_{-1} \leftarrow 0; i \leftarrow M-1; s \leftarrow 1$
As long as $i \geq 0$, repeat:
$k \leftarrow (/s) \times (k+1)$
$s \leftarrow s \oplus D_i \oplus ((D_{i-1} \text{ AND } (k \bmod 2))$
$R_0 \leftarrow R_0 \times R_{k \times s}$
$i \leftarrow i - k \times s - (/D_i)$
Return R0,
where $R_0$ and $R_1$ are values stored in two registers, respectively,
k is a loop pointer indicating a number of executions performed with the common set of instructions, and
s is a state pointer indicating whether the predefined number has been reached.

16. A method according to claim 8, wherein at least two of the following data items, (a) the value of a loop pointer, (b) the value of a state pointer, (c) the value of the input variable, and (d) the number of instructions of the selected block of instructions, are linked and such linking is defined by a table with several inputs.

17. A method according to claim 16, used in the implementation of an exponentiation calculation of the type $B=A^D$, with D being an integer number of M bits, and each bit ($D_i$) of D corresponding to an input variable of input index i, comprising the following step:

As long as $i \geq 0$, repeat the common set of instructions:
$k \leftarrow (/s) \times (k+1) + s \times 2 \times (/D_i)$
$s \leftarrow U(k,1)$
$\gamma(k,s): R_0 \leftarrow R_0 \times R_{U(k,0)}$
$i \leftarrow i-s$
where (U(k,1)) is the following matrix:

$$(U(k,1)) \begin{matrix} 0 \leq k \leq 2 \\ 0 \leq 1 \leq 1 \end{matrix} = \begin{pmatrix} 0 & 0 \\ 1 & 1 \\ 0 & 1 \end{pmatrix},$$

$R_0$ and $R_1$ are values stored in two registers, respectively,
k is a loop pointer indicating a number of executions performed with the common set of instructions, and
s is a state pointer indicating whether the predefined number has been reached.

18. A method according to claim 16, used in the implementation of an exponentiation calculation of the type $B=A^D$ according to the algorithm (M, M³), with D being an integer number of M bits, and each bit ($D_i$) of D corresponding to an input variable of input index i, comprising the following step:

As long as $i \geq 0$, repeat the common set of instructions:
$k \leftarrow (/s) \times (k+1) + s \times (D_i + 2 \times (/D_i \text{ AND } D_{i-1}))$
$s \leftarrow U(k,2)$
$\gamma(k,s): R_0 \leftarrow R_0 \times R_{U(k,0)};$
$i \leftarrow i - U(k,1)$
where (U(k,1)) is the following matrix:

$$(U(k,1)) \begin{matrix} 0 \leq k \leq 5 \\ 0 \leq 1 \leq 2 \end{matrix} = \begin{pmatrix} 0 & 1 & 1 \\ 0 & 0 & 0 \\ 1 & 1 & 1 \\ 0 & 0 & 0 \\ 0 & 0 & 0 \\ 2 & 2 & 1 \end{pmatrix},$$

$R_0$ and $R_1$ are values stored in two registers, respectively,
k is a loop pointer indicating a number of executions performed with the common set of instructions, and
s is a state pointer indicating whether the predefined number has been reached.

19. A method according to claim 16, used in the implementation of a calculation on an elliptic curve in affine coordinates, a calculation using operations of the addition or doubling of points type, and in which the following step is performed:

As long as $i \geq 0$, repeat:
$\gamma(k): R_{U(k,0)} \leftarrow R_1 + R_3;$
$R_{U(k,1)} \leftarrow R_{U(k,1)} + R_{U(k,2)};$
$R_5 \leftarrow R_2/R_1; R_{U(k,3)} \leftarrow R_1 + R_5;$
$R_{U(k,4)} \leftarrow R_5^2;$
$R_{U(k,4)} \leftarrow R_{U(k,4)} + a;$
$R_1 \leftarrow R_1 + R_{U(k,5)};$
$R_2 \leftarrow R_1 + R_{U(k,6)}; R_6 \leftarrow R_1 + R_{U(k,7)};$
$R_5 \leftarrow R_5 \cdot R_6; R_2 \leftarrow R_2 + R_5$
$s \leftarrow k - D_i + 1$
$k \leftarrow (k+1) \times (/s);$
$i \leftarrow i-s;$ where (U(k,1)) is the following matrix:
(U(k, 1)) (U(k, 1))

$$(U(k,1)) \begin{matrix} 0 \le k \le 1 \\ 0 \le 1 \le 10 \end{matrix} = \begin{pmatrix} 1 & 2 & 4 & 1 & 6 & 6 & 4 & 3 \\ 6 & 6 & 3 & 5 & 1 & 5 & 2 & 6 \end{pmatrix}.$$

$R_0$ and $R_1$ are values stored in two registers, respectively, k is a loop pointer indicating a number of executions performed with the common set of instructions, and s is a state pointer indicating whether the predefined number has been reached.

20. A method according to claim 16, wherein said several inputs comprise a matrix.

21. A method for obtaining an elementary set of instructions common to a plurality of predefined blocks of instructions, for implementing a cryptographic calculation method according to claim 1, comprising the following steps:

E1: breaking down each predefined block of instructions into a series of elementary blocks that are equivalent in the context of a covert channel attack, and classifying all the elementary blocks, E2: identifying a common elementary block that is equivalent to all the elementary blocks of all the predefined blocks of instructions, E3: identifying a common block comprising at least the common elementary block previously identified and an instruction to update a loop pointer such that an execution of the common elementary block associated with the value of the loop pointer and an execution of the elementary block with a rank equal to the value of the loop pointer are identical.

22. A method according to claim 21, wherein, during step E1, at least one fictional instruction is added to at least one predefined block of instructions.

23. A method according to claim 1, wherein said electronic device is a chip card.

\* \* \* \* \*